J. E. EARLE.
Tea and Coffee Pot.
No. 91,104.
Patented June 8, 1869.
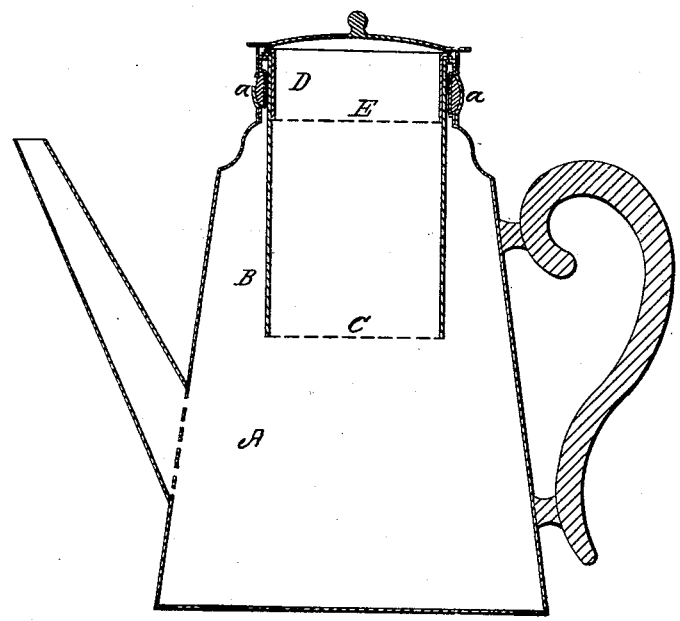
Witnesses:
E. S. Gibbits
A. J. Tibbits
Inventor:
John E. Earle.

United States Patent Office.

JOHN E. EARLE, OF NEW HAVEN, CONNECTICUT.

Letters Patent No. 91,104, dated June 8, 1869.

IMPROVEMENT IN TEA AND COFFEE-POTS.

The Schedule referred to in these Letters Patent and making part of the same.

*To all whom it may concern:*

Be it known that I, JOHN E. EARLE, of New Haven, in the county of New Haven, and State of Connecticut, have invented a new Improvement in Tea and Coffee-Pot; and I do hereby declare the following, when taken in connection with the accompanying drawing, and the letters of reference marked thereon, to be a full, clear, and exact description of the same, and which said drawing constitutes part of this specification, and represents a vertical central section of the tea or coffee-pot.

This invention relates to an improvement in that class of coffee-pots within which is arranged a perforated cylinder, for the reception of coffee, with a perforated cup above, and which has heretofore been constructed with a water-joint, as in the patents granted to Thomas Bishop, November 1, 1859; George Jones, April 16, 1867; George Jones, December 8, 1868.

In the use of the water-joint in pots, so soon as the pot is tipped, the water-joint, which is designed to prevent the escape of the aroma from the coffee, is destroyed, inasmuch, as by tipping the pot, the water which formed the packing runs below.

In urns constructed on this principle with the water-joint, the aroma, which naturally rises to the top of the vessel, condenses in the water, and is lost to quite as great an extent as it would be were the top left open, the water in a short time becoming impregnated with the aroma or best portion of the coffee, and which cannot in any manner be utilized.

By my invention these difficulties are entirely overcome; and

It consists in a material packing placed between the cover and vessel, so as to positively pack the joint under all circumstances, and prevent the escape of the aroma.

To enable others skilled in the art to make and use my invention, I will proceed to describe the same as illustrated in the accompanying drawings.

A is the body of the pot or urn, as the case may be.

B, the cylinder, having a perforated bottom, C, upon which the coffee or tea, as the case may be, is placed.

D is a cup placed within the cylinder at the top, the bottom E of which is perforated, so that boiling water, poured upon the bottom E of the cup D, will sprinkle on to the coffee below, and pass through into the vessel in like manner as in pots and urns before described.

Around the neck of the vessel, I form a groove, or other means for holding a packing, *a*, which I form from India rubber, felt, leather, or any suitable material, so that when the cover is set on to the vessel it will fit closely on to the packing, so as to prevent the escape of the aroma from the vessel.

If preferred, the vessel may be constructed so that the cover will set inside; in that case it may be desirable that the packing be arranged upon the flange of the cover, instead of upon the neck of the vessel.

This construction, while it accomplishes to the fullest extent the invention, also lessens the cost of construction.

Having fully described my invention,

What I claim as new and useful, and desire to secure by Letters Patent, is—

In combination with the perforated cylinder B, within the body A, the arrangement of the material packing *a* between the cover and vessel, substantially in the manner and for the purpose set forth.

JOHN E. EARLE.

Witnesses:
E. S. TIBBITS,
A. J. TIBBITS.